July 16, 1963

G. DIRIAN ETAL 3,098,020

PROCESS FOR THE ISOTOPIC ENRICHMENT OR
FRACTIONATION OF HYDROGEN

Filed Aug. 11, 1960

INVENTORS
GRÉGOIRE DIRIAN
HENRI SACK
Mrs. FERNANDE BOTTER born BERGHEAUD
BERNARD LEFRANCOIS BY Bacon & Thomas

ATTORNEYS

United States Patent Office 3,098,020
Patented July 16, 1963

3,098,020
PROCESS FOR THE ISOTOPIC ENRICHMENT OR FRACTIONATION OF HYDROGEN
Grégoire Dirian, Palaiseau, Henri Sack, Le Raincy, Fernande Botter, born Bergheaud, Chatillon-sous-Bagneux, and Bernard Lefrançois, Noeux-les-Mines, France, assignors to Houilleres du Bassin du Nord et du Pas-de-Calais, Douai, France, a public establishment of France, and Commissariat a l'Energie Atomique, Paris, France
Filed Aug. 11, 1960, Ser. No. 48,959
Claims priority, application France Aug. 28, 1959
5 Claims. (Cl. 204—59)

It is known that a very effective process for the isotopic fractionation of hydrogen is the electrolysis of water. If, for example, an aqueous solution of soda or sulphuric acid is submitted to direct current electrolysis, the water is decomposed into hydrogen and oxygen. The hydrogen is found to be impoverished in deuterium with respect to the starting water, whilst the residual water is found to be enriched in deuterium. If one designates for example by $C_{H_2O}$ the isotopic content of the water (expressed as the ratio between the number of atoms of deuterium to the total number of atoms of deuterium and hydrogen in the aqueous phase) and by $C_{H_2}$ the isotopic content of the hydrogen produced (expressed as the same ratio in the hydrogen gas produced), the separation factor $f$ is defined by the ratio:

$$f = \frac{C_{H_2O}}{C_{H_2}}$$

In carrying out this process, it is usual to obtain values of $f$ situated between 5 and 7, and thus larger than the equilibrium factor $f_E$ resulting from the simple putting into isotopic equilibrium of water and hydrogen, for example by contact in the presence of a suitable catalyst, this factor $f_E$ only being of the order of 3 at ambient temperature. However, the general adoption of this isotopic enrichment process is hindered by high consumption of electric current. This electrolytic process, by reason of its ease of application, would be more attractive if one could obtain still larger separation factors $f$, susceptible of compensating for the consumption of electric current.

The present invention relates to the isotopic fractionation of hydrogen by electrolytic decomposition of liquid ammonia under conditions which enable high separation factors to be obtained. This separation factor $f$ is here defined in the same manner as for the electrolysis of aqueous solutions, namely:

$$f = \frac{C_{NH_3}}{C_{H_2}}$$

It is known that liquid ammonia, being a poor conductor of electric current, requires the addition of an electrolyte. This electrolyte can be either an "acid," or a "base." These ideas of an "acid" or a "base" in liquid ammonia are somewhat different from what they are in aqueous phase, but are well known to specialists. (See for example "Non-Aqueous Solvents," by L. Andrieth and J. Kleinberg, John Wiley & Sons, New York, 1953, chapters 3, 4 and 5.)

For example, potassium amide in solution in liquid ammonia is a "base," whilst ammonium bromide is an "acid." The electrolysis of both these solutions releases hydrogen at the cathode and nitrogen at the anode.

It has been discovered, according to the invention, that high separation factors are obtained in such a process of electrolysis of liquid ammonia, by the use of the following characteristics, taken together or separately:

Use of acid electrolytes,

Low temperatures, preferably in the region of the solidification temperature of the solution at atmospheric pressure; these temperatures can be higher if one operates under a higher pressure, Use of cathodes of metals, such as iron, copper, nickel, or of alloys of these metals.

Thus it follows from the above, that the present process can be carried out either at atmospheric pressure or under higher pressures. In practice, the pressure applied can attain 1000 kg./cm.$^2$ without seriously affecting the separation factor $f$ but can allow the conditions of the process to be adapted to the applications envisaged for the electrolysis gases, for example for the synthesis of ammonia or the realisation of series of isotopic enrichments.

In a first preferred embodiment of the invention, in which the process is operated under atmospheric pressure, the electrolyte is a solution of ammonium bromide in liquid ammonia, the concentration of which can vary from 5 grammes per litre up to the solubility limit at the operating temperature; the anode is of carbon or graphite and the cathode is of iron, copper or nickel. The temperature can be anywhere between the freezing point and the boiling point of the solution, and preferably between −70 and −30° C. The electrolysis voltage employed can vary between 3 and 30 volts and the current density between 0.01 and 0.3 ampere/cm.$^2$.

In a second embodiment of the invention, the process is operated under pressure and the operating conditions are the same as before, except that the temperature can go up to +100° C., the voltage can vary from 0.5 to 30 volts and the current density can vary between 0.05 and 0.5 ampere/cm.$^2$.

In the two above-mentioned embodiments, separation factors between 15 and 30 can be attained.

There are shown schematically in the accompanying drawings devices suitable for carrying out the two above-mentioned embodiments of the invention.

Figure 1:
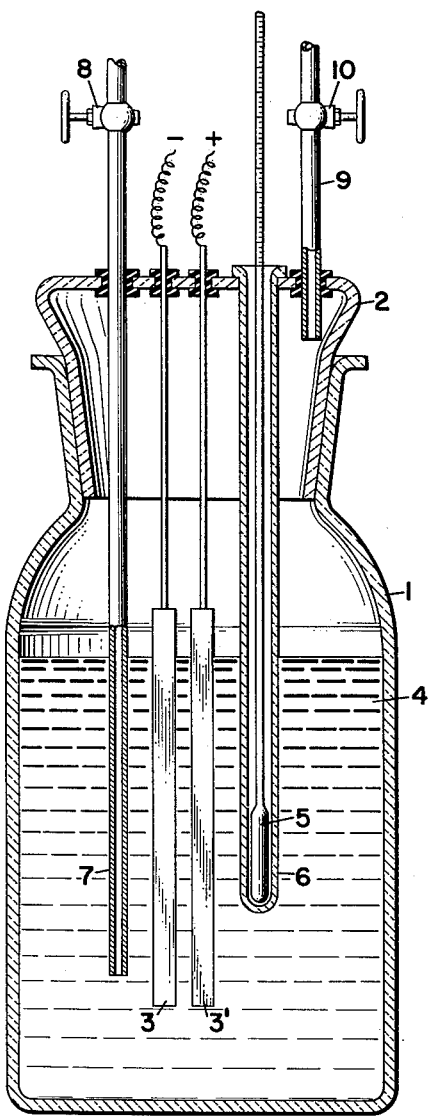
FIGURE 1 illustrates a device intended to function at atmospheric pressure.

The device shown in FIGURE 1 comprises a glass electrolyser 1 of 300 cc. volume made of heat-resisting glass such as is known under the registered trademark "Pyrex," which is plugged by a sealed ground stopper 2 to which are fixed: a pair of electrodes 3—3' which, in a particular case, have a height of 15 cms. and a width of 4.5 cms. separated by about 1.5 cms., of which about 11 cms. are immersed in the electrolytic solution 4; a thermometer 5 mechanically isolated from the electrolyte by a casing 6, and a dip pipe 7 allowing, by means of a valve 8, the introduction of previously dried ammonium bromide, and of ammonia possibly enriched in deuterium; this pipe 7 also allows the removal of samples of the solution in the liquid ammonia with a view of their isotopic analysis. Finally, it is provided with a pipe 9 fitted with a valve 10 for the drawing off the gases of electrolysis.

In the case shown in FIGURE 1, the electrolysis gases consist of a mixture of one volume of nitrogen to three volumes of hydrogen. However, in the case where it is desired to recover the hydrogen and nitrogen separately, the electrolyser can comprise two compartments separated by a diaphragm and each provided with an outlet pipe.

Figure 2:
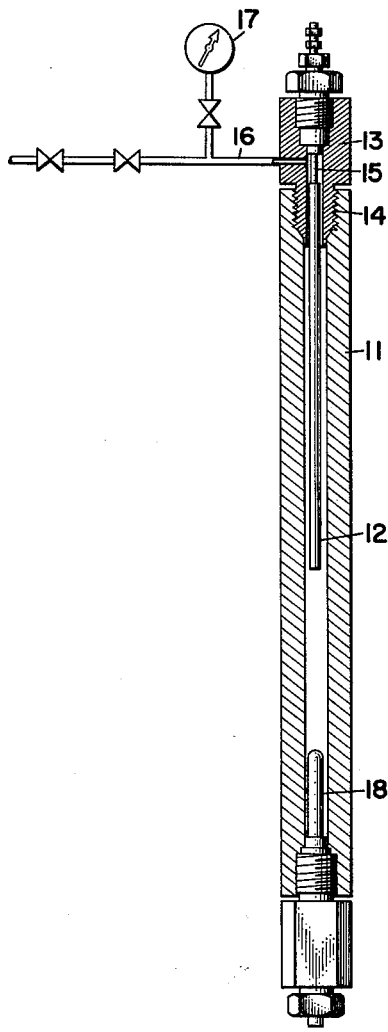
FIGURE 2 illustrates a device intended to function under increased pressure.

In FIGURE 2 a device is shown which can be operated under pressure. This device comprises a tube 11 of stainless steel of composition: carbon=0.15%, chromium=6%, molybdenum=0.5%, vanadium=0.3%, with a capacity of 180 cc.

The internal surface of tube 11 constitutes the cathode of the electrolyser.

The anode is constituted by a graphite rod 12 mounted in a stopper 13 screwed at 14 into one extremity of the tube 11 and having a bore 15 into which there opens a tube 16 for the admission, and then for the evacuation, of the reactants.

The pressure is measured by a manometer 17 and the temperature by a thermometer 18.

In the two cases shown in FIGURES 1 and 2, although the means have not been shown, the electrolyser is externally cooled and the electric supply is direct current.

The examples which follow will enable the influence of the various factors, which have been previously enumerated, on the value of the various separation coefficients to be appreciated.

EXAMPLE 1

An electrolysis is effected under the following conditions: electrolysis under atmospheric pressure, iron cathode, graphite anode, electrolyte constituted by a solution of ammonium bromide in liquid ammonia at a concentration of about 30 grammes of bromide per litre of liquid ammonia, electrolysis carried out at $-45°$ C. under a voltage of 8.3 volts corresponding to a current density of 0.06 ampere/cm.$^2$. The isotopic content of the starting ammonia $C_{NH_3}$, is 2615 p.p.m. (parts per million) of deuterium, the isotopic content of the hydrogen produced by electrolysis $C_{H_2}=92.5$ p.p.m. of deuterium, the separation factor $$f = \frac{C_{NH_3}}{C_{H_2}} = 28.3$$

EXAMPLE 2

Example 1 is repeated with the difference that the cathode is of copper, the temperature of electrolysis is $-55°$ C. and the voltage is 9 volts. The isotopic content of the initial ammonia $C_{NH_3}=2910$ p.p.m. of deuterium, that of the electrolytic hydrogen $C_{H_2}=108$ p.p.m. of deuterium. The separation factor is then $$f = \frac{C_{NH_3}}{C_{H_2}} = 26.9$$

EXAMPLE 3

Example 1 is repeated with the following modifications: the cathode is of nickel, the electrolysis temperature is $-50°$ C. and the voltage is 8.8 volts. The isotopic content of the initial electrolyte $C_{NH_3}=2790$ p.p.m. of deuterium, the isotopic content of the hydrogen produced is 122.5 p.p.m. of deuterium. The separation factor obtained is thus $f=22.7$.

EXAMPLE 4

Example 1 is repeated with the following modifications: the cathode is of aluminium, the temperature is $-60°$ C. and the voltage is 10.8 volts. For an isotopic content of the starting electrolyte of $C_{NH_3}=2340$ p.p.m. of deuterium, the isotopic content of the hydrogen produced was $C_{H_2}=1002$ p.p.m. of deuterium thus giving a separation factor $f=2.3$.

Examples 1 to 4 illustrate the influence of the nature of the metal of the cathode. It is noted that for the three metals, iron, copper, nickel, separation factors $f$ are obtained 10 to 12 times higher than if other metals are chosen for the cathode.

EXAMPLE 5

A basic solution of potassium amide in liquid ammonia at a concentration of 40 gms. of $NH_2K$ per litre of ammonia was electrolysed under atmospheric pressure at a temperature of $-40°$ C., under a voltage of 8 volts corresponding to a current density of 0.03 ampere/cm.$^2$ between a carbon anode and a platinum cathode; the separation factor $f$ was 6.

Example 5 illustrates the application of the process in the case of operating with a "basic" electrolyte and shows that the factor of enrichment in deuterium is not greater than that resulting from the electrolysis of water.

EXAMPLE 6

*Process Under Pressure*

A solution of 100 gms. per litre of ammonium bromide in liquid ammonia is introduced under a pressure of 350 kg./cm.$^2$ into the tube of FIGURE 2. The anode is of graphite, and the cathode is of stainless steel being constituted by the internal wall of the tube.

The temperature is $-20°$ C., the voltage is 7 volts, the mean current density is 0.15 a./cm.$^2$. The separation factor obtained is $$f = \frac{C_{NH_3}}{C_{H_2}} = \frac{142}{8.5} = 16.7$$

We claim:

1. A process for the isotopic fractionation of hydrogen by the electrolysis of liquid ammonia comprising electrolyzing said liquid ammonia in the presence of an acid electrolyte using a current density of between about 0.01 and 0.5 amp./cm.$^2$, a voltage of between about 0.5 and 30 volts and a cathode made of a material selected from the group consisting of iron, copper, nickel and alloys of these metals to thereby release hydrogen gas and nitrogen gas, said hydrogen gas having a lower deuterium concentration than said liquid ammonia whereby said liquid ammonia is enriched in said deuterium.

2. A process as claimed in claim 1 wherein the electrolysis is operated under atmospheric pressure at a temperature of between about $-70$ and $-30°$ C.; the current density is between about 0.01 and 0.3 amp./cm.$^2$; and the voltage is between about 3 and 30 volts.

3. A process as claimed in claim 1 wherein the electrolysis is operated under super-atmospheric pressure of up to 1,000 kg./cm.$^2$ at a temperature of up to 100° C.; the current density is between about 0.05 and 0.5 amp/cm.$^2$ and the voltage is between about 0.5 and 30 volts.

4. A process as claimed in claim 1 wherein the electrolysis is carried out using a carbon anode.

5. A process as claimed in claim 1 wherein the acid electrolyte is ammonium bromide at a concentration in the liquid ammonia of between 5 grams per liter and the solubility limit at the operating temperature.

References Cited in the file of this patent

UNITED STATES PATENTS 2,841,543    Haller _____ July 1, 1958

OTHER REFERENCES

Booth et al.: "Journal of Physical Chemistry," volume 35 (1931), pages 3303–3321.